(12) United States Patent
Iwasaki et al.

(10) Patent No.: US 7,537,858 B2
(45) Date of Patent: May 26, 2009

(54) CATALYST STRUCTURE AND FUEL CELL HAVING THE SAME

(75) Inventors: Tomio Iwasaki, Tsukuba (JP); Hideo Miura, Sendai (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 10/872,456

(22) Filed: Jun. 22, 2004

(65) Prior Publication Data

US 2004/0258978 A1    Dec. 23, 2004

(30) Foreign Application Priority Data

Jun. 23, 2003    (JP)    ............. 2003-177439

(51) Int. Cl.
H01M 4/86 (2006.01)
(52) U.S. Cl. ...................................... 429/40
(58) Field of Classification Search ............ 429/40; 123/672, 703; 502/101
See application file for complete search history.

(56) References Cited

U.S. PATENT DOCUMENTS 4,454,169 A    6/1984    Hinden et al.

2003/0082431 A1*   5/2003   Klitsner et al. ............... 429/38
2003/0129477 A1    7/2003   Hitomi
2003/0194600 A1*  10/2003   Pan ........................... 429/44

FOREIGN PATENT DOCUMENTS

| DE | 199 58 959 A1 | 6/2000 |
| JP | 2003-247414 | 9/2003 |
| JP | 2004-024979 | 1/2004 |
| WO | WO 01/37359 A2 | 5/2001 |

OTHER PUBLICATIONS

European Search Report dated May 23, 2006 (Four (4) pages).
Applied Physics, vol. 71, No. 8 (2002) pp. 1005-1006.
J. Appl. Phys., vol. 54, No. 9 (1983) pp. 4877.
"Physical Review B", vol. 29, (1984), pp. 5367-5369.

* cited by examiner

*Primary Examiner*—Patrick Ryan
*Assistant Examiner*—Monique Wills
(74) *Attorney, Agent, or Firm*—Crowell & Moring LLP

(57) ABSTRACT

The present invention provides a catalyst structure of high catalytic activity and a fuel cell of high cell output. The catalyst structure comprises a conductive film and catalyst particles formed on the conductive film wherein the difference between lattice constant of a material constituting the conductive film and that of a material constituting the catalyst particles is not more than 16%, and preferably not less than 3%.

3 Claims, 6 Drawing Sheets

CATALYST STRUCTURE AND FUEL CELL HAVING THE SAME

INCORPORATION BY REFERENCE

The present application claims priority from Japanese application JP-2003-177439 filed on Jun. 23, 2003, the content of which is hereby incorporated by Reference into this application.

BACKGROUND OF THE INVENTION

The present invention relates to a catalyst structure and a fuel cell using the same.

Fuel cells have been noticed as energy sources of the next generation, and, recently, fuel cells using, as a fuel, a material other than hydrogen which is difficult to handle are investigated, and methanol is particularly noticed. For example, as disclosed in "Applied Physics", Vol. 71, No. 8 (2002), pages 1005-1006, fuel cells which produce electricity by direct reaction of methanol at electrodes are called direct methanol fuel cells (DMFC) and researched as fuel cells used for portable devices, etc. The problem of DMFC to be solved is to improve the cell output, and as also disclosed in the above literature (Applied Physics), it is now studied to increase the effective area of catalyst by providing irregularities on the surface of the catalyst, thereby improving catalytic activity.

Furthermore, for example, JP-A-2003-247414 proposes a method for operating an exhaust gas purification apparatus for vehicle internal combustion engines which solves the problem that exhaust gas purification catalyst particles grow at high temperatures to reduce the effective area to cause deterioration of catalytic function. Moreover, as environmental problems become serious, apparatuses for disposal of exhaust gases discharged from factories and power stations are also proposed as disclosed in JP-A-2004-24979.

BRIEF SUMMARY OF THE INVENTION

However, it cannot be said that the above publications sufficiently disclose catalyst structures of high catalytic activity. Furthermore, the technologies disclosed in the above publications are not sufficient to provide fuel cells of high cell output.

Thus, the first object of the present invention is to provide a catalyst structure of high catalytic activity. The second object of the present invention is to provide a fuel cell of high cell output. The third object of the present invention is to provide a catalyst structure that is stable even at high temperatures. The fourth object of the present invention is to provide an exhaustion gas purification system having a high function.

The inventors have conducted intensive researches to solve the above problems, and found that it is effective for improving the catalytic activity of a catalyst comprising catalyst particles formed in contact with a conductive film that the difference between lattice constant of a material constituting the conductive film and that of a material constituting the catalyst particles is 16% or less. It has further been found that the difference of the lattice constant is preferably 3% or more, and more preferably 3% or more and 11% or less. The objects of the present invention can be attained, for example, by the catalyst structure and fuel cell having the following constructions.

(1) In a catalyst structure comprising a conductive film and catalyst particles formed on the conductive film, the difference between lattice constant of a material constituting the conductive film and that of a material constituting the catalyst particles is not more than 16%.

(2) In a catalyst structure comprising a conductive film, catalyst particles formed adjacent to the conductive film and a coating material formed in contact with the catalyst particles, the difference between lattice constant of a material constituting the conductive film and that of a material constituting the catalyst particles is not more than 16%.

(3) In the catalyst structure of the above (1) or (2), a main constituting material of the catalyst particles is an alloy of a platinum group metal. Alternatively, in the catalyst structure of the above (1) or (2), a main constituting material of the catalyst particles is PtRu or PtMo.

(4) In the catalyst structure of the above (1) or (2), a main constituting material of the catalyst particles is, for example, an alloy of a platinum group metal, and a main constituting element of the conductive film is one element selected from the group consisting of Ni, Co, Fe, Cu, Au, Ag, Al and Ti.

Furthermore, a main constituting material of the coating material in the catalyst structure is a DNA molecule.

(5) In the catalyst structure of the above (2), a main constituting material of the catalyst particles is PtRu or PtMo and the catalyst particles have a size of not less than 2.6 nm and not more than 4.2 nm, a main constituting element of the conductive film is one element selected from the group consisting of Ni, Co, Fe, Cu, Au, Ag, Al and Ti, and a main constituting material of the coating material is a DNA molecule.

(6) In the catalyst structure of the above (2), a main constituting material of the catalyst particles is an alloy of a platinum group metal, a main constituting element of the conductive film is one element selected from the group consisting of Ni, Co, Fe, Cu, Au, Ag, Al and Ti, and a main constituting material of the coating material is carbon nanohorn.

(7) In the catalyst structure of the above (2), a main constituting material of the catalyst particles is PtRu or PtMo, a main constituting element of the conductive film is one element selected from the group consisting of Ni, Co, Fe, Cu, Au, Ag, Al and Ti, and a main constituting material of the coating material is carbon nanohorn.

(8) In a fuel cell comprising an electrolyte film, a fuel electrode formed adjacent to one side of the electrolyte film and an oxygen electrode formed adjacent to another side of the electrolyte film which is opposite to the side having the fuel electrode thereon, a fuel prepared from an alcohol is used for the fuel electrode and the oxygen electrode is provided with the catalyst structure of any one of the above (1)-(7).

(9) In a fuel cell comprising an electrolyte film, a fuel electrode formed adjacent to one side of the electrolyte film and an oxygen electrode formed adjacent to another side of the electrolyte film which is opposite to the side having the fuel electrode thereon, a fuel prepared from an alcohol is used for the fuel electrode and the oxygen electrode is provided with a catalyst structure of any one of the above (1)-(7).

(10) In an exhaust gas purification system provided with an exhaust gas supplying part for the exhaust gas coming from an internal combustion engine and a catalyst converter into which the exhaust gas supplied from the exhaust gas supplying part is introduced, the catalyst converter is provided with a catalyst structure of any one of the above (1)-(3). Specifically, for example, in an exhaust gas purification system for vehicle internal combustion engines which is provided with a catalyst converter of upstream side and a catalyst converter of downstream side, at least the catalyst converter of upstream side can be a catalyst converter having the catalyst structure of any one of the above (1) to (7).

(11) In an exhaust gas disposal system provided with an exhaust gas supplying part, a first bag filter device for removing dusts in the supplied exhaust gas, an adsorbent packing layer device for removing organic halogen compounds contained in the exhaust gas passing through the first bag filter device, and a second bag filter device for removing acidic components in the exhaust gas passing through the adsorbent packing layer device, the adsorbent packing layer device is provided with the catalyst structure of any one of the above (1) to (7).

Here, the term "main constituting material" means a material which is present in the highest atomic concentration, and the term "main constituting element" means an element which is present in the highest atomic concentration.

According to the present invention, there can be provided a catalyst of high catalytic activity. Furthermore, there can be provided a fuel cell of high cell output.

Other objects, features and advantages of the invention will become apparent from the following description of the embodiments of the invention taken in conjunction with the accompanying drawings.

DETAILED DESCRIPTION OF THE INVENTION

Figure 1:
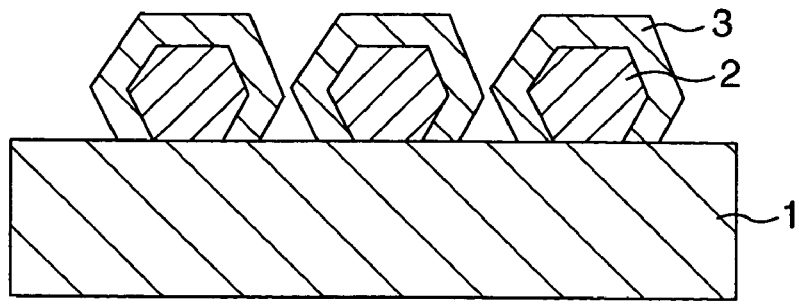
FIG. 1 schematically shows a catalyst structure of the first example of the present invention.

The preferred embodiments of the present invention will be explained in detail referring to the examples shown in the drawings. The present invention is not limited to these embodiments, but may be modified on the basis of known technologies and technologies which may be known in the future.

First, FIG. 1 shows outline of main parts in the catalyst structure which is the first example of the present invention. As shown in FIG. 1, the catalyst structure of this example is such that catalyst particles 2 are formed in contact with a conductive film 1, and a coating material 3 is further formed. The effect of the coating material will be explained hereinafter, and when this effect is not needed, the coating material can be omitted. Here, it is preferred that the difference between lattice constant of a material constituting the conductive film 1 and that of a material constituting the catalyst particles 2 is not more than 16%. The difference in lattice constant is more preferably not less than 3%. The difference in lattice constant is further preferably not less than 3% and not more than 11%. This is because when the lattice constant satisfies the above conditions, the size of the catalyst particles can be made sufficiently smaller (for example, 10 nm or less) at room temperature (20° C.), and the total surface area of the catalyst particle can be made larger. Thus, the catalytic activity function can be improved. If the difference in lattice constant is less than 3%, the catalyst atoms are arranged in accordance with the arrangement of atoms on the surface of the conductive film, and hence the catalyst is not formed in the form of particles, but formed in the form of a film. Therefore, it is difficult to make larger the total surface area of the catalyst particles. If the difference in lattice constant exceeds 16%, since the lattice mismatching of the conductive film 1 and the catalyst particles 2 is too large, diffusion of the catalyst atoms vigorously occurs and the catalyst particles adhere to each other to cause increase in particle size. In this case, too, the total surface area cannot be made larger. When the difference in lattice constant is not more than 16%, diffusion of the catalyst particles is inhibited and the size of the catalyst particles can be made sufficiently small (for example, 10 nm or less) at room temperature. Preferably, the difference is further controlled to 3% or larger.

In order to explain in detail the effect of this example, an analytical example by molecular dynamics simulation will be shown. The molecular dynamics simulation is a method in which the force acting on each atom is calculated through interatomic potential, and Newton's equation of motion is solved on the basis of the calculated force, thereby to calculate the position of each atom at each time, as disclosed, for example, in "Journal of Applied Physics", Vol.54 (1983), page 4877. In this example, the relation referred to hereinafter is obtained by calculating the interaction between different elements with taking the charge transfer into the method of molecular dynamics.

As mentioned above, the main effect of this example is that when the difference between the lattice constant of conductive film 1 and that of catalyst particles 2 is 16% or less, diffusion of the catalyst particles is inhibited and the size of the catalyst particles 2 can be made sufficiently small at room temperature. Thus, this effect can be shown by calculating the diffusion coefficient of the catalyst particles 2 at around the interface between the catalyst particles 2 and the conductive film 1 and analyzing the dependence of the diffusion coefficient on the lattice mismatching. The method for calculation of the diffusion coefficient by the molecular dynamics simulation is mentioned in, for example, "Physical Review B", Vol. 29 (1984), pages 5367-5369.

Figure 2:
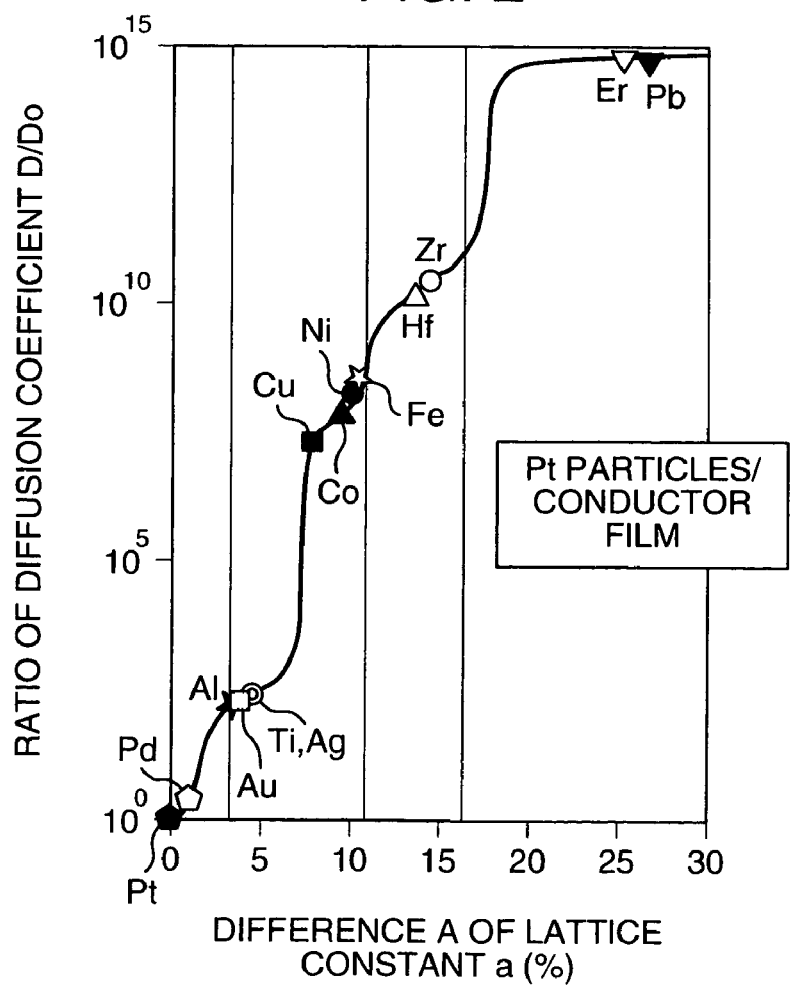
FIG. 2 shows a relation between lattice mismatching of Pt catalyst particles/conductive film and ratio of diffusion coefficient.

First, on the simulation when coating material 3 is not present and Pt is used as the material of the catalyst particles 2, a relative difference A in lattice constant a of the formed catalyst particles 2 and the conductive film 1 is taken on the abscissa axis, and the result of calculation of the diffusion coefficient D of the catalyst particles 2 at an interface between the catalyst particles 2 and the conductive film 1 is taken on the ordinate axis. Here, the lattice constant a means a distance between the closest atoms. In FIG. 2, Do indicates the diffusion coefficient when the material of the catalyst particles 2 and that of the conductive film 1 are both Pt.

In this example, Pt is preferably used, but the main constituting material of the catalyst particles may be PtRu or PtMo. This is because PtRu and PtMo have nearly the same lattice constant as of Pt and, hence, have basically the similar characteristics. Description of drawings on PtRu and PtMo will be omitted by making the following explanation taking Pt catalyst particles as an example. Moreover, since other platinum group elements have the similar basic tendency, explanation of drawings on these elements will be omitted. Thus, from other viewpoints, the platinum group elements other than Pt can also be used.

Figure 3:
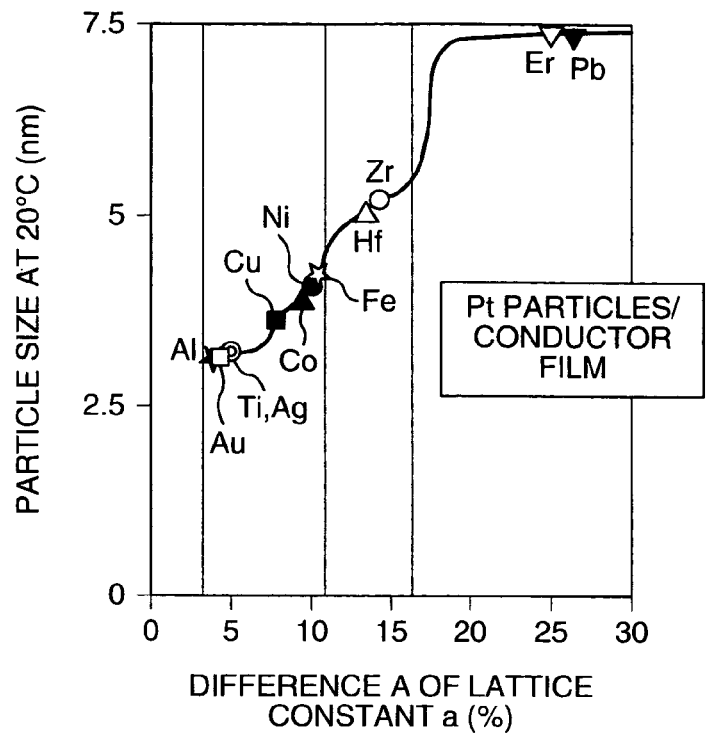
FIG. 3 shows a relation between lattice mismatching of Pt catalyst particles/conductive film and particle size at 20° C. when the coating material is not present.

From the results of simulation shown in FIG. 2, it can be seen that the larger the difference in lattice constant, the larger the diffusion coefficient, and the catalyst particles are apt to adhere to each other, resulting in growing of the particles. In this way, diffusion coefficients of Pt and Pd are smaller, and those of Al, Au, Ti, Ag, Cu, Co, Ni, Fe, Er and Pb increase in succession. FIG. 3 shows the results of the simulation on particle size. FIG. 3 resembles FIG. 2, and it can be seen that the particle size is large in the area of large diffusion coefficient. Especially, when the difference in lattice constant exceeds 16%, the diffusion coefficient shown in FIG. 2 increases conspicuously. Therefore, the difference in lattice constant is not more than 16%. Moreover, it can be seen that the particle size shown in FIG. 3 also increases conspicuously. In the area where the difference in lattice constant is less than 3%, the particle size is not shown in FIG. 3, and this means that the particles are in the form of a film. Therefore, the difference in lattice constant is preferably not less than 3%. Accordingly, in order to increase the total surface area of the catalyst particles, the difference in lattice constant is preferably not less than 3% and not more than 16%. From FIG. 3, in order to sufficiently reduce the particle size (to, for example, 5 nm or less), the difference in lattice constant is preferably not more than 11%.

Figure 4:
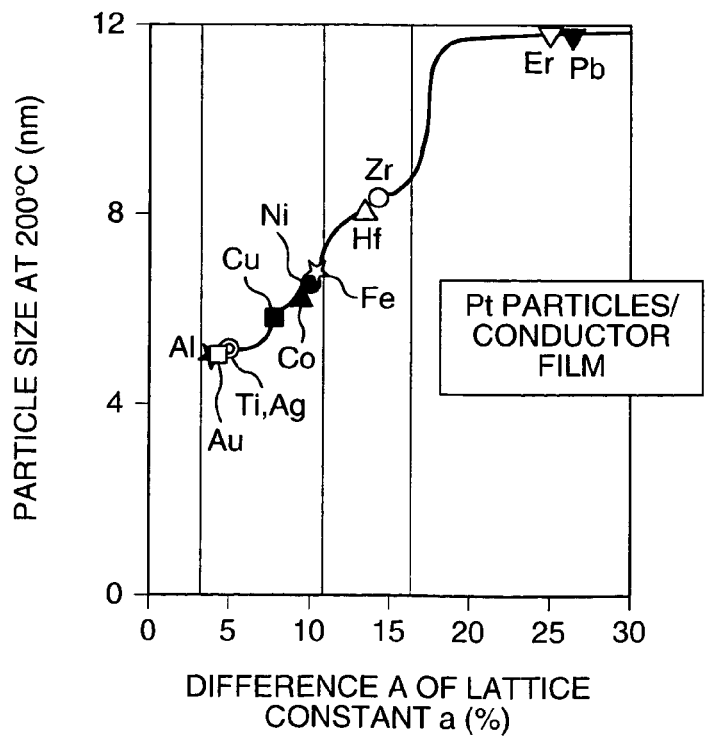
FIG. 4 shows a relation between lattice mismatching of Pt catalyst particles/conductive film and particle size at 200° C. when the coating material is not present.
Figure 5:
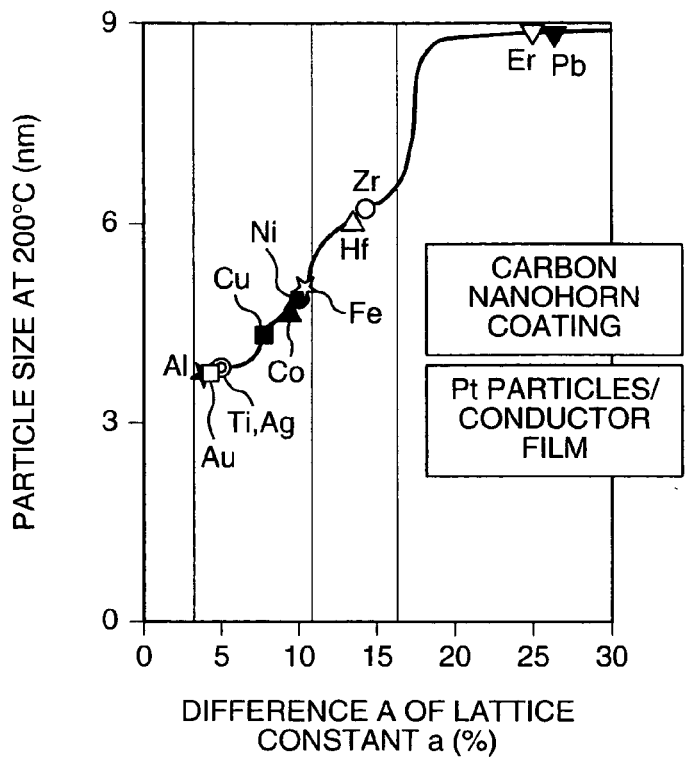
FIG. 5 shows a relation between lattice mismatching of Pt catalyst particles/conductive film and particle size at 200° C. when the coating material is carbon nanohorn.

Next, FIG. 4 shows particle size at 200° C. It shows that the size of the catalyst particles is larger as compared with the particle size at room temperature shown in FIG. 3. On the other hand, FIG. 5 shows the results of simulation conducted at 200° C. using carbon nanohorn as a coating material. When FIG. 5 is compared with FIG. 4 where the coating material is not used, it can be seen that the particle size in FIG. 5 is smaller by about 20-30%. Therefore, it can be said that growth of particles at high temperatures can be inhibited by using carbon nanohorn as the coating material.

Figure 6:
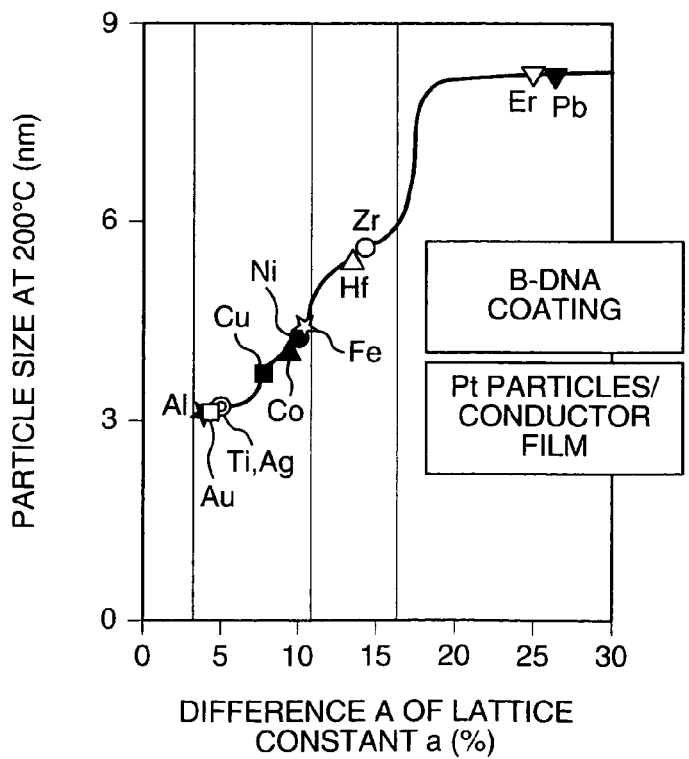
FIG. 6 shows a relation between lattice mismatching of Pt catalyst particles/conductive film and particle size at 200° C. when the coating material is B-DNA.
Figure 7:
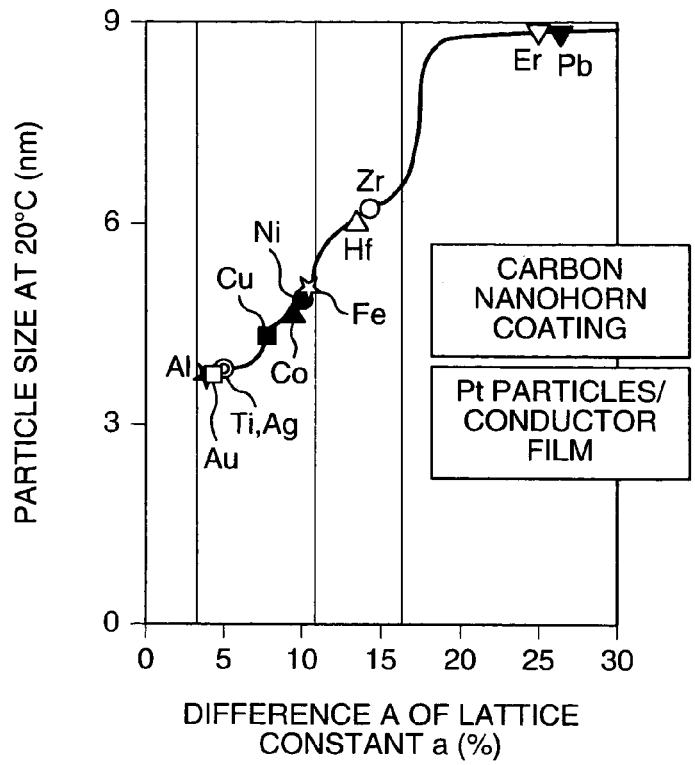
FIG. 7 shows a relation between lattice mismatching of Pt catalyst particles/conductive film and particle size at 20° C. when the coating material is carbon nanohorn.
Figure 8:
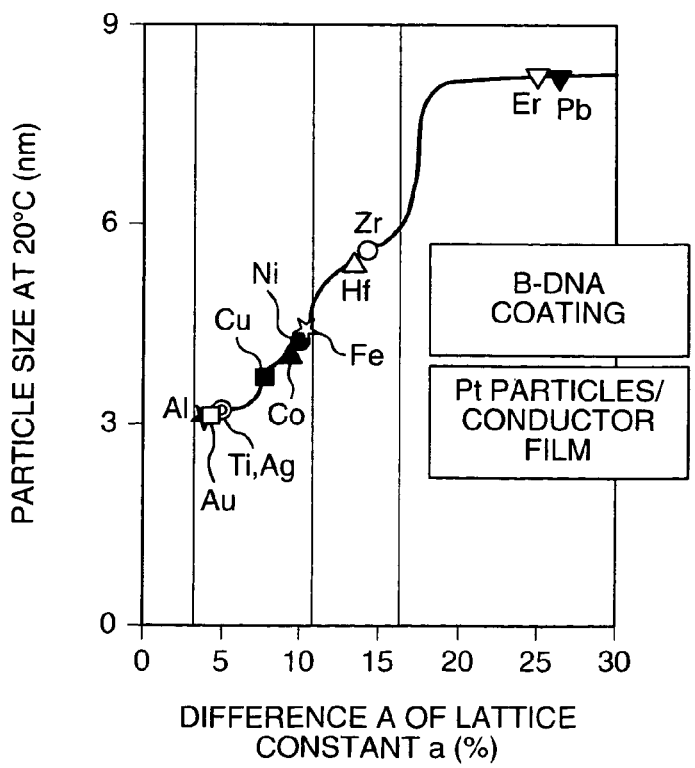
FIG. 8 shows a relation between lattice mismatching of Pt catalyst particles/conductive film and particle size at 20° C. when the coating material is B-DNA.

Next, FIG. 6 shows the results of simulation conducted at 200° C. using B-DNA as the coating material. When FIG. 6 is compared with FIG. 5 where carbon nanohorn is used as the coating material, it can be seen that the particle size in FIG. 6 is smaller by about 20-30%. Therefore, it can be said that B-DNA is higher in the effect to inhibit growth of particles than carbon nanohorn. FIG. 7 and FIG. 8 show the results of simulation conducted at 20° C. corresponding to FIG. 5 and FIG. 6. Since the results are close to those of the simulation conducted at 200° C. (FIG. 5 and FIG. 6), it is recognized that the coating materials comprising carbon nanohorn or DNA have the effect of reducing the particle size independently of temperatures.

Figure 9:
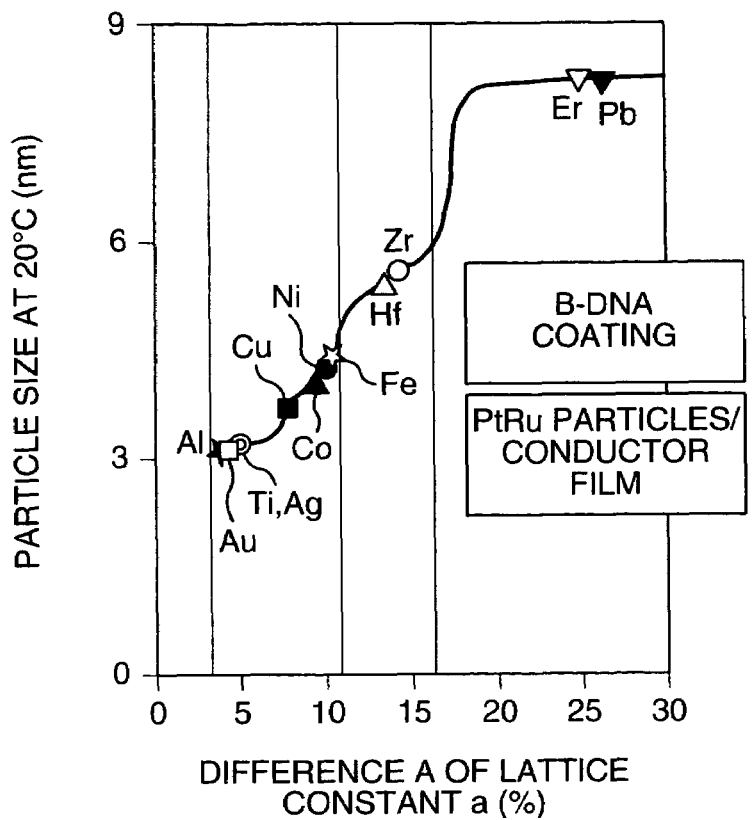
FIG. 9 shows a relation between lattice mismatching of Pt catalyst particles/conductive film and particle size at 20° C. when the coating material is B-DNA.

In the above examples, Pt particles are used as the catalyst particles, but it is more preferred to use PtRu particles or PtMo particles which have resistance to poisoning with CO. By the same simulation as of the Pt particles, it can be shown that the similar effects can also be obtained with PtRu particles and PtMo particles. For example, FIG. 9 shows the results of simulation conducted at 20° C. using PtRu particles as the catalyst particles and B-DNA as the coating material. The results of FIG. 9 show nearly the same results as of FIG. 8, and it can be seen that the effect to reduce the particle size can also be obtained by using PtRu particles having a high resistance to poisoning with CO in place of Pt particles.

Figure 10:
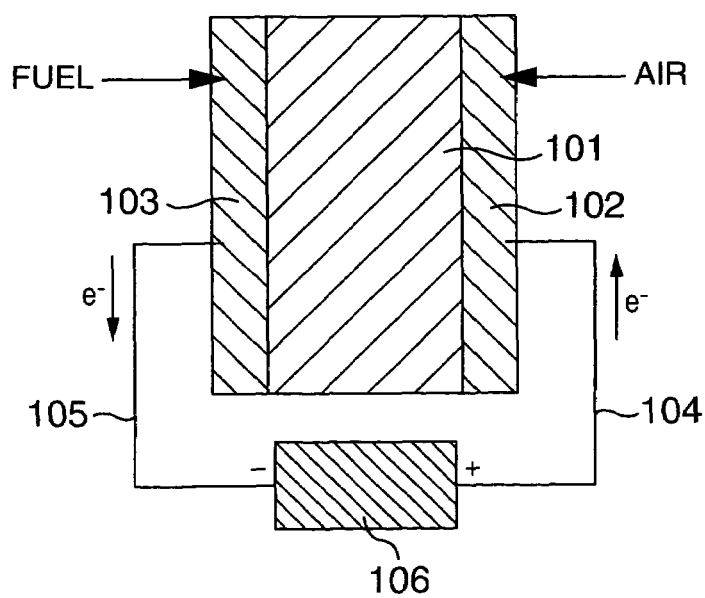
FIG. 10 schematically shows a fuel cell of the second example of the present invention.

Next, FIG. 10 schematically shows the structure of a fuel cell which is the second example of the present invention. As shown in FIG. 10, the fuel cell of this example has such a structure that on both sides of electrolyte film 101 are provided catalyst-supporting electrodes (catalyst-supporting electrodes 102 and 103), to which wirings 104 and 105 and load 106 are connected. As a fuel, for example, methanol is used. The catalyst-supporting electrode 102 is an oxygen electrode and the catalyst-supporting electrode 103 is a fuel electrode. As the catalyst particles used for the oxygen electrode 102, it is preferred to use a material containing a catalyst which accelerates the reduction of oxygen molecules, such as Pd or a Pd alloy. The fuel electrode 103 preferably has such a catalyst structure as shown in the first example. For example, it is preferred that PtRu particles or PtMo particles which are high in resistance to poisoning with CO are used as the catalyst particles for the fuel electrode 103, and that the electrode (conductive film) which supports the catalyst particles comprises a main constituting element selected from the group consisting of Ni, Co, Fe, Cu, Au, Ag, Al, and Ti. It is especially preferred to use at least either one of Al, Au, Ti and Ag. As a result, the difference in lattice constant can effectively be reduced, and the particle size can also be made sufficiently fine. Since the catalytic activity function can be improved by the effects as shown in the first example, the fuel cell of this example is high in cell output.

Figure 11:
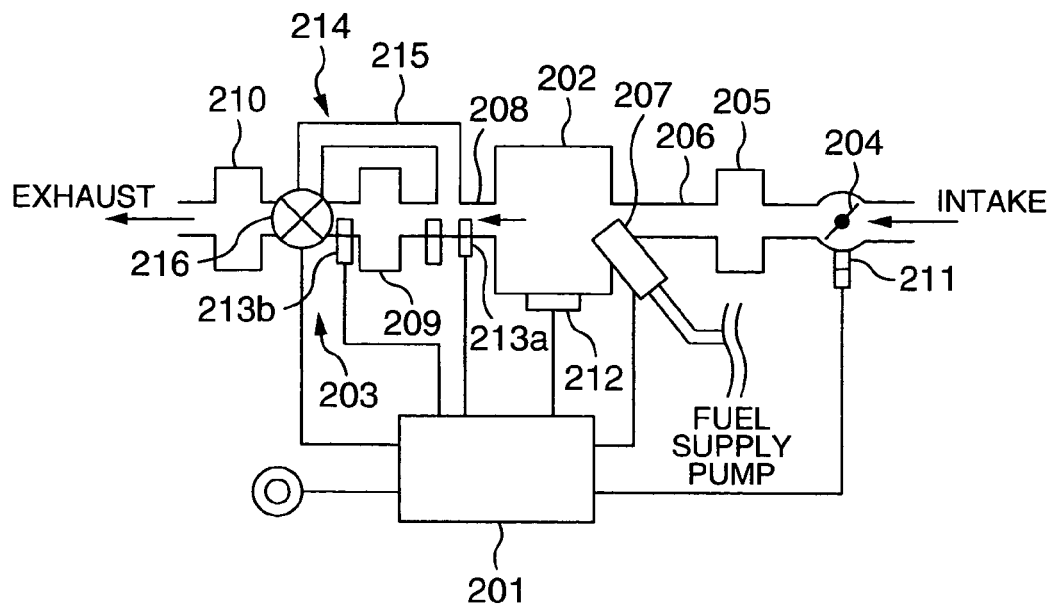
FIG. 11 schematically shows an exhaust gas purification system of the third example of the present invention.

Next, FIG. 11 schematically shows an exhaust gas purification system which is the third example of the present invention. FIG. 11 shows an example of the exhaust gas purification system having the same construction as of FIG. 1 in JP-A-2003-247414. As shown in FIG. 11, this exhaust gas purification system comprises an electronic engine operation controlling device (ECU) 201, an internal combustion engine 202, an exhaust system 203, a throttle valve 204, a surge tank 205, an intake manifold 206, a fuel injection device 207, an exhaust manifold 208, an upstream-side catalyst converter 209, a downstream-side catalyst converter 210, a throttle opening sensor 211, a crank angle sensor 212, oxygen sensors 213*a* and 213*b*, a bypass means 214, a bypass channel 215, and a channel selector valve 216. The oxygen sensor 213*a* is a sensor for detecting an air-fuel ratio of a mixed gas combusted with residual oxygen in the exhaust gas, and the oxygen sensor 213*b* is a sensor for detecting whether the bypass selector means normally works or not. A feature of this example is that the catalyst structure of the upstream-side catalyst converter which works at high temperatures has a catalyst structure shown, for example, in the first example. For example, it is preferred that such particles as having a platinum group element as a main constituting element (such as Pt particles, Ru particles, Rh particles, PtRu particles or PtMo particles) are used as the catalyst particles for the upstream-side catalyst converter 209, and a material having one element selected from the group consisting of Ni, Co, Fe, Cu, Au, Ag, Al, and Ti as a main constituting element is used a material supporting the catalyst particles. Especially preferred is a material having either one of Al, Au, Ti and Ag. As a result, the difference in lattice constant can have a more preferable value, and the particle size can be in sufficiently fine state. Since the upstream-side catalyst converter is kept at high temperatures, the particle size is apt to become larger according to conventional technologies while in this example, the particle size can be made fine, resulting in an exhaust gas purification system of high function.

Figure 12:
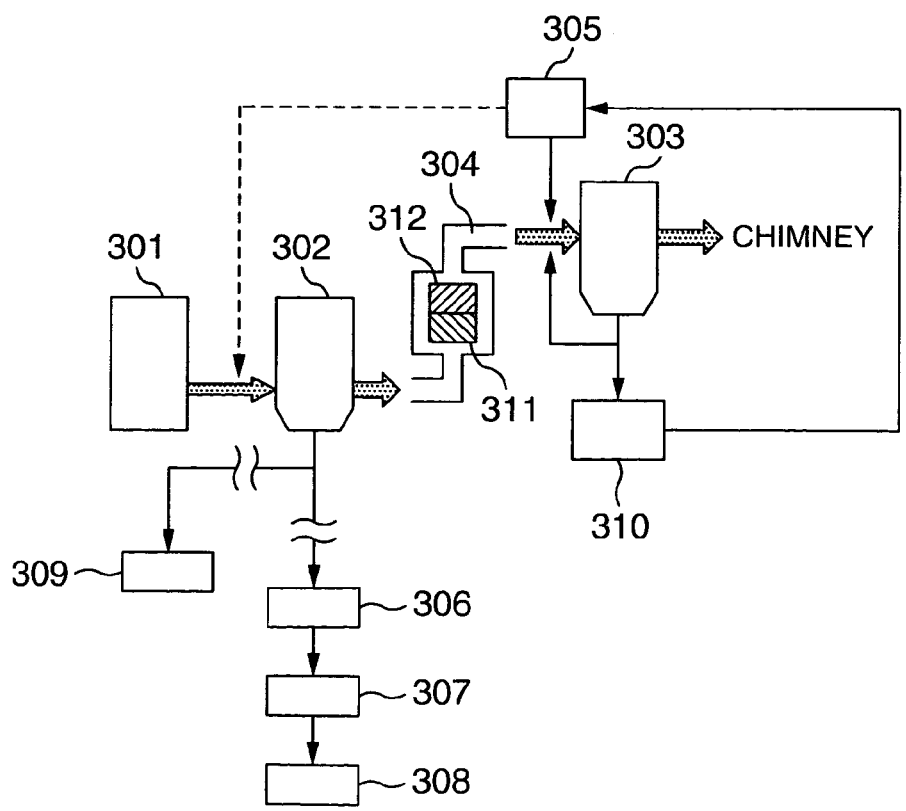
FIG. 12 schematically shows an exhaust gas purification system of the fourth example of the present invention.

Next, FIG. 12 schematically shows an exhaust gas disposal system which is the fourth example of the present invention. FIG. 12 shows an example of the exhaust gas disposal system having the same construction as of FIG. 1 in JP-A-2004-24979. This exhaust gas disposal system is provided with a first bag filter device 302, a second bag filter device 303, an adsorbent packing layer device 304, a neutralizer spraying device 305, a fly ash heating device 306, a heavy metal disposal device 307, a reclamation device 308, an ash melting device 309, and regeneration device 310 in respect to an exhaust gas generation source 301. In this example, the adsorbent packing layer device 304 is provided with an adsorbent 311 which adsorbs and removes organic halogen compounds and a catalyst structure 312 which decomposes and removes the above compounds mainly by catalytic action. A feature of this example is that the catalyst structure 312 has a catalyst structure as shown, for example, in the first example. For example, it is preferred that such particles as having a platinum group element as a main constituting element (such as Pt particles, Ru particles, Rh particles, PtRu particles or PtMo particles) are used as the catalyst particles for the catalyst structure 312, and a material having one element selected from the group consisting of Ni, Co, Fe, Cu, Au, Ag, Al, and Ti as a main constituting element is used as a material supporting the catalyst particles. Especially preferred is a material having either one of Al, Au, Ti and Ag. As a result, the difference in lattice constant can have a more preferable value, and the particle size can be in sufficiently fine state. Since an exhaust gas of high temperature may enter into the catalyst structure 312 and the catalyst structure may be exposed to high temperatures, the particle size is apt to become larger according to conventional technologies while in this example, the particle size can be made fine, resulting in an exhaust gas disposal system of high function.

The invention claimed is:

1. A catalyst structure which comprises a conductive film, catalyst particles formed adjacent to the conductive film and a coating material formed in contact with the catalyst particles and in which the difference between lattice constant of a material constituting the conductive film and that of a material constituting the catalyst particles is not more than 16%, wherein a main constituting material of the catalyst particles is PtRu or PtMo and the catalyst particles have a size of not less than 2.6 nm and not more than 4.2 nm, a main constituting element of the conductive film is one element selected from the group consisting of Ni, Co, Fe, Cu, Au, Ag, Al and Ti, and a main constituting material of the coating material is a DNA molecule.

2. A catalyst structure which comprises a conductive film, catalyst particles formed adjacent to the conductive film and a coating material formed in contact with the catalyst particles and in which the difference between lattice constant of a material constituting the conductive film and that of a material constituting the catalyst particles is not more than 16%, wherein a main constituting material of the catalyst particles is an alloy of a platinum group metal, a main constituting element of the conductive film is one element selected from the group consisting of Ni, Co, Fe, Cu, Au, Ag, Al and Ti, and a main constituting material of the coating material is carbon nanohorn.

3. A catalyst structure which comprises a conductive film, catalyst particles formed adjacent to the conductive film and a coating material formed in contact with the catalyst particles and in which the difference between lattice constant of a material constituting the conductive film and that of a material constituting the catalyst particles is not more than 16%, wherein a main constituting material of the catalyst particles is PtRu or PtMo, a main constituting element of the conductive film is one element selected from the group consisting of Ni, Co, Fe, Cu, Au, Ag, Al and Ti, and a main constituting material of the coating material is carbon nanohorn.

* * * * *